United States Patent
Jung et al.

(10) Patent No.: US 7,630,340 B2
(45) Date of Patent: Dec. 8, 2009

(54) HANDOVER METHOD

(75) Inventors: Hee-Young Jung, Daejeon (KR); Jong-Hwa Lee, Daejeon (KR); Hyeong-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 518 days.

(21) Appl. No.: 11/024,274

(22) Filed: Dec. 27, 2004

(65) Prior Publication Data
US 2006/0029020 A1    Feb. 9, 2006

(30) Foreign Application Priority Data
Aug. 3, 2004    (KR) .................. 10-2004-0061063

(51) Int. Cl.
*H04W 4/00*    (2006.01)
(52) U.S. Cl. .................. 370/331; 370/313; 455/433; 455/436; 455/439; 455/442
(58) Field of Classification Search .................. 370/331, 370/389, 466, 467, 469, 401; 455/433, 435.1, 455/436, 442, 439
See application file for complete search history.

(56) References Cited

U.S. PATENT DOCUMENTS

| | | | | |
|---|---|---|---|---|
| 6,539,225 | B1 * | 3/2003 | Lee .............................. | 455/436 |
| 6,826,154 | B2 * | 11/2004 | Subbiah et al. ............. | 370/236 |
| 7,031,709 | B2 * | 4/2006 | Watanabe et al. ........... | 455/436 |
| 7,158,497 | B2 * | 1/2007 | Li et al. ....................... | 370/331 |
| 7,471,661 | B1 * | 12/2008 | Wang et al. ................. | 370/338 |
| 2001/0046223 | A1 * | 11/2001 | Malki et al. ................. | 370/338 |
| 2006/0146748 | A1 * | 7/2006 | Ng et al. ..................... | 370/331 |

OTHER PUBLICATIONS

Hesham Soliman, Flarion et al. Hierarchical Mobile IPv6 mobility management (HMIPv6), IETF MIPSHOP Working Group, Internet-Draft, pp. 1-29.
Rajeev Koodli, Fast Handovers for Mobile IPv6, Mobile IP Working Group, Internet Draft, Jan. 30, 2004, pp. i-38.
Y. Han, A Supplementary Scheme for New Care-of Address Configuration and Confirmation in FMIPv6, IETF MIPSHOP Working Group, Internet-Draft, Expires Jul. 15, 2004, pp. 1-8.

* cited by examiner

*Primary Examiner*—Jason E Mattis
*Assistant Examiner*—Dady Chery
(74) *Attorney, Agent, or Firm*—Blakely, Sokoloff, Taylor & Zafman LLP

(57) ABSTRACT

In a handover method, a mobile node receives a Layer 2 trigger message; requests information on Layer 3 of a new access router (NAR) from a previous access router (PAR) by using information included in the Layer 2 trigger message and information on an IP address of the NAR and a new Care of Address (NCoA) to be used when moving to the NAR; and performs registration with a Home Agent (HA) of the mobile node and sending binding update to an associated correspondence node by using the NCoA when a Layer 2 handover is occurred. With this configuration, the present invention provides a handover method automatically creating an address using a MAC (Medical access control) address in the mobile IPv6 (Internet Protocol version 6).

9 Claims, 8 Drawing Sheets

HANDOVER METHOD

CROSS REFERENCE TO RELATED APPLICATION

This application claims priority to and the benefit of Korea Patent Application No. 10-2004-61063 filed on Aug. 3, 2004 in the Korean Intellectual Property Office, the entire content of which is incorporated herein by reference.

BACKGROUND OF THE INVENTION (a) Field of the Invention

The present invention relates to a handover method, and particularly it relates to a handover method using a MAC (Media Access Control) address of less than 64 bits in a mobile IPv6 (Internet Protocol version 6) to automatically reserve addresses for a handover.

(b) Description of the Related Art

As the use of Internet has been explosively increased, the internet protocol IP (Internet Protocol) has lead technology on existing data networks and wired/wireless communication networks. Accordingly, standardization in networks has been accelerated under an AII-IP architecture forming an IP-based network: from a terminal to a core network.

A Mobile IPv6 developed by IETF (Internet Engineering Task Force) is the most leading technology that supports mobility to each node in the next-generation Internet Protocol, IP version 6 (IPv6). Similar to mobile IPv4, the mobile IPv6 [D. Johnson et. Al, mobility Support in IPv6, draft-ietf-mobileip-ipv6-24.txt, 2003, 6] is designed to provide transparent mobility to upper layers including a transport control protocol (TCP) layer from a network layer. A mobile host in the mobile IPv6 sends a binding update to a home agent (HA) and associated corresponding nodes (CNs) using a care-of-address (CoA) to update a current location to maintain connectivity to the Internet when the mobile host changes its access router for another.

FIG. 1 illustrates a handover in a conventional mobile IPv6.

In the conventional mobile IPv6 network, as shown in FIG. 1, a Layer 2 handover occurs, in Step of S101. The Layer 2 handover represents a physical change of a link. Then, a Layer 3 handover is detected through neighbor unreachability detection in the Layer 3, in Step of S102. Once the Layer 3 handover is detected, a mobile node creates a new link-local address valid in a current link, in Step of S103. Herein, the new link-local address may be occupied by other nodes, and therefore the mobile node needs to verify the uniqueness of the new link-local address by performing a Duplicated Address Detection (DAD) process, in Step of S104. Once the new link-local address is verified, the mobile node discovers its default router in consequence to a Router Discovery process in Step of S105, and discovers prefix information attached to the default router in Step of S106. Further, the mobile node creates a global address for its own use based on the prefix information in Step of S107. Herein, the new global address also must be verified through the DAD process in Step of S108. Once the new global address is verified, the mobile node registers the new global address with the HA in Step of S109 and sends the binding update to the associated CNs using the new global address in Step of S110.

As described, the mobile node in the conventional mobile IPv6 performs the DAD process twice for the new link-local address and the new global address, and each DAD process consumes at least one second. Further, the mobile node detects its movement in the Layer 3 by receiving a Router Advertisement message. The Router Advertisement message is delivered on every three seconds in accordance with the IPv6 standard. A delivery interval of the Router Advertisement message is set to be 30 ms to 70 ms in the mobile IPv6, but it is difficult to be substantially implemented by a router.

Further, similar to the mobile IPv4, the mobile IPv6 is designed to support mobility in a wide area, and thus handover latency during a registration process may be an obstacle for to support a real-time service including a VoIP (Voice Over IP) which will be an essential part of the Internet in the near future. Hence, the IETF group studies various methods to support a fast handover in the mobile IPv6 so as to overcome the handover latency.

HMIPv6 [Hesham Soliman, Hierarchical MIPv6 mobility management, IETF Internet Draft draft-ieff-mobileip-hmipv6-07.txt, 2002. 10] is one of disclosed methods to support the fast handover. The mobile node in the conventional mobile IP is required to register its new CoA with an HA which may be located away whenever the mobile node moves, and thereby inducing unacceptable handover latency. However, the mobile node in the HMIPv6 registers the new CoA with a MAP (Mobile Anchor Point) whenever the mobile node moves to another subnets and thereby minimizing the handover latency since it takes less time to bind-update a local MAP than a distant HA. However, the time for the binding update of the Layer 3 is partially reduced because the binding update of the Layer 3 is performed after completion of the binding update of the Layer 2.

FMIPv6 [G. Dommety, Fast Handovers for Mobile IPv6, IETF Internet Draft draft-ieff-mobileip-fast-mipv6-60.txt, 2003. 3] is another method to support the fast handover. The FMIPv6 is designed to reduce handover latency at Layer 3 using handover trigger information sent from Layer 2 so as to offer the real-time service including the VoIP of the mobile nodes in the IP network. In the FMIPv6, the mobile node receives a trigger message pre-notifying occurrence of Layer 2 handover, and begins to a process of new CoA (NCoA) assignment while the mobile node is still attached to a current access router. Further, a bi-directional tunnel is established between the current access router (previous access router, PAR) and a new access router (NAR) to prevent loss of data until completion of the binding updates to the NCoA.

Such a fast handover method may reduce the handover latency by creating a NCoA which may increase the handover latency and performing the DAD process to verify the NCoA prior to the occurrence of the handover, but the process of the fast handover method can be complicated and the handover latency can be more increased if the Layer 2 trigger message is not timely sent.

Further, although the foregoing handover methods support the handover in the mobile IPv6, IPv6 stateless address auto-configuration restricts to support the handover. In other words, the foregoing handover methods require an additional process including the DAD process to verify an automatically generated new address, and the DAD process consumes at least one second under an optimal condition and thereby adds delay to the handover (in the case of the mobile HMIPv6) and causes a more complicated and unstable handover process (in the case of the fast handover method).

Accordingly, simplification of movement detection and the DAD process of the mobile IPv6 may reduce the handover latency and thereby support real-time applications. Further, the handover performance will be more enhanced when the simplified handover is combined to the HMIPv6 that is the most efficient method of reducing the binding update time.

SUMMARY OF THE INVENTION

It is an advantage of the present invention to provide a handover method reducing handover latency in a less than 64-bit MAC address system including a 48-bit IEEE address to automatically reserve addresses for a handover in mobile IPv6.

In one aspect of the present invention, in a handover method of the IPv6 (Internet protocol version 6), a mobile node receives a Layer 2 trigger message. The mobile node requests information on Layer 3 of a new access router (NAR) from a previous access router (PAR) by using information included in the Layer 2 trigger message, receives information on an IP address of the NAR and a new Care of Address (NCoA) to be used when moving to the NAR, and performs registration with a Home Agent (HA) and sends the binding update to a correspondence node using the NCoA when a Layer 2 handover is occurred.

The mobile node requesting the information on the Layer 3 of the NAR requests the information on the Layer 3 of the NAR from the PAR by using a MAC address of the NAR included in the Layer 2 trigger message.

The NCoA comprises a prefix information field, a MAC address field, and a handover address field. The prefix information field stores information on a prefix attached to the NAR, the MAC address field stores a MAC address of the NAR and the handover address field stores a handover in a certain pattern.

The PAR comprises an address pool storing and managing the handover address field.

In another aspect of the present invention, in a handover method of IPv6 (Internet protocol version 6), a mobile node receives a Layer 2 trigger message. The mobile node requests information on Layer 3 of a new access router (NAR) from a previous access router (PAR) by using the information included in the Layer 2 trigger message, and receives information on the Layer 3 of the NAR from the PAR and information on an IP address of the NAR. Further, the mobile node creates a new Care of Address (NCoA) to be used when moving to the NAR by using the information on the Layer 3 of the NAR, and performs registration with a Home Agent (HA) and sends the binding update to a correspondence node using the NCoA when a Layer 2 handover is occurred.

The mobile node requesting the information on the Layer 3 of the NAR requests the information on the Layer 3 of the mobile node from the PAR by using a MAC address of the mobile node included in the Layer 2 trigger message.

The mobile node receiving the information on the Layer 3 of the NAR receives an IP address and prefix information of the NAR from the PAR.

The mobile node creating the new Care of Address (NCoA) to be used when moving to the NAR uses the prefix information of the NAR to create the NCoA.

The Layer 2 handover comprises link down and link up processes. The PAR forwards packets sent to the mobile node to the NAR and the NAR buffers the forwarded packets when the link down is occurred. Further, the NAR sends the buffered packets to the mobile node when the link up is occurred and the Layer 2 handover is completed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
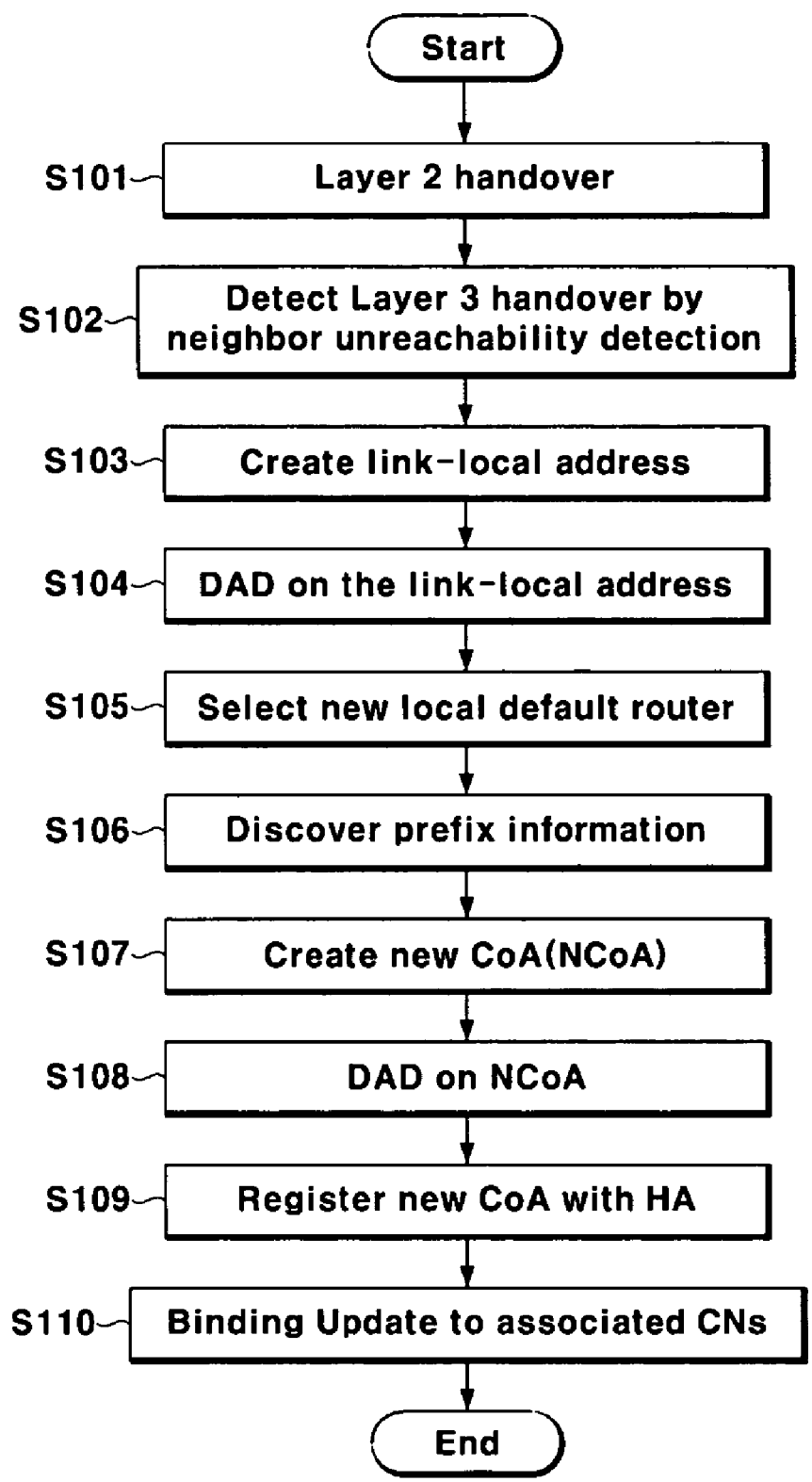
FIG. 1 illustrates a handover in a conventional mobile IPv6.

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive There may be parts shown in the drawings, or parts not shown in the drawings, that are not discussed in the specification as they are not essential to a complete understanding of the invention. Like reference numerals designate like elements.

First, a schematic handover process according to an embodiment of the present invention will be described in detail, referring to FIG. 2.

Figure 2:
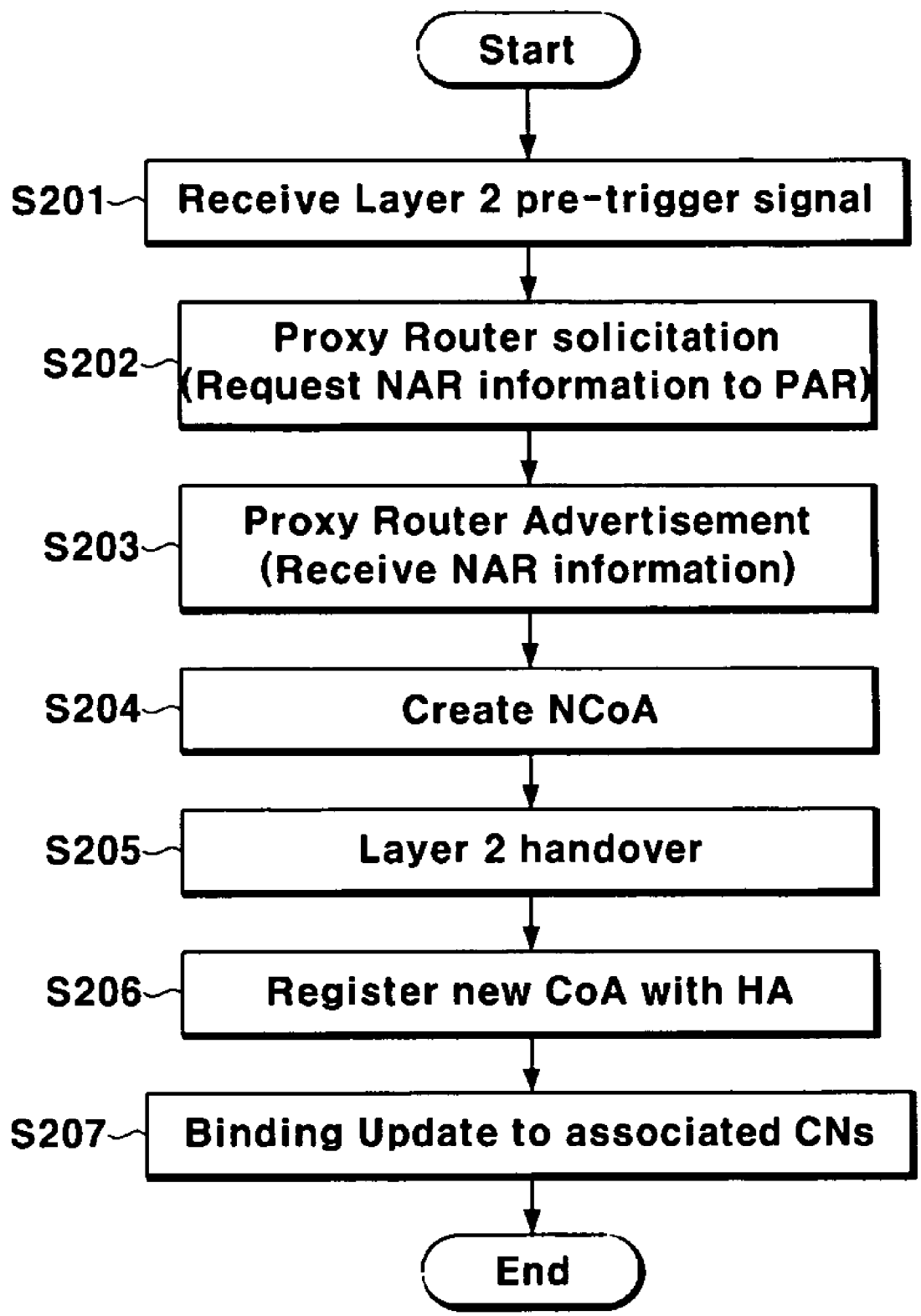
FIG. 2 illustrates a schematic process of a handover according to an embodiment of the present invention.

As shown in FIG. 2, a mobile node according to the embodiment of the present invention receives a Layer 2 trigger message pre-notifying an occurrence of a Layer 2 handover, in Step of S201. It is necessary for the mobile node to receive the Layer 2 trigger message in advance such that the mobile node supports a fast handover at the IP Layer. Herein, the Layer 2 trigger message sent to the mobile node includes a Layer 2 identifier (e.g., MAC address) for a new access router (NAR) to which the mobile node will move.

The mobile node which has received anticipation information pre-notifying the movement to a new subnet requires information on Layer 3 using the Layer 2 information from a previous access router (PAR), in Step of S202. Then, the PAR deliveries NAR information (including an IP address and prefix information) to the mobile node, in Step of S203.

The mobile node which has received the NAR information creates an address to be used when moving to the NAR in advance, in Step of S204. Herein, the new address is a unique address according to the embodiment of the present invention, and thus a DAD (Duplicated Access Detection) process is not necessary for verifying the new address. Therefore, handover latency becomes reduced.

Then, the Layer 2 handover is occurred in Step of S205 and the mobile node registers the new address with the HA in Step of S206 and sends the binding update to an associated CN in Step of S207.

Figure 3A:
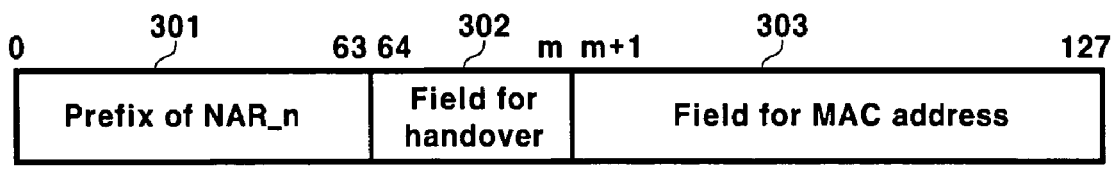
FIGS. 3a through 3c illustrate an IPv6 address structure for the handover according to the embodiment of the present invention.
Figure 3B:
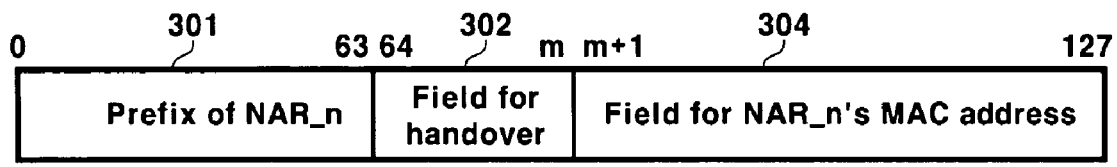
Figure 3C:
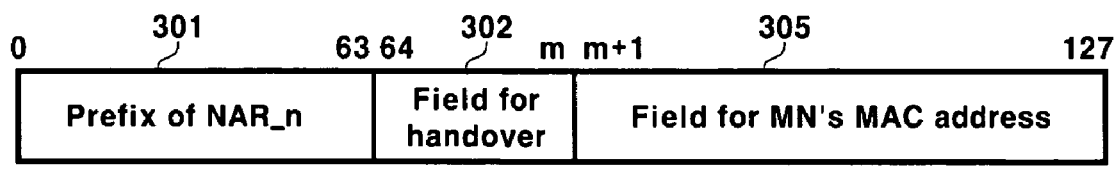

FIGS. 3a through 3c illustrate a unique address structure of the IPv6 for the handover according to the embodiment of the present invention.

FIG. 3a illustrates a general address structure of the IPv6 for the handover according to the embodiment of the present invention. The general IPv6 address according to the embodiment of the present invention includes a prefix 301 attached to the NAR, an address field for handover 302 among a 64-bit MAC address excluding an actual MAC address threrefrom, and a less than 64-bits MAC address 303.

FIG. 3b illustrates an address structure of the IPv6 when the MAC address of the NAR 304 uses the MAC address field 303.

In this case, (m-64) bit 302 excluding the prefix of the NAR 301 and the MAC address of the NAR 304 may be reserved for the handover. That is, $2^{m-64}$ addresses are reserved for the handover. In general, when (64~m) bits are filled with a distinct pattern to form a 64-bit subfield according to the EUI-64 standard, the 64-bit subfield excluding the 64~m bits filled with the distinct pattern becomes available addresses for the handover. In other words, when there is k number of the distinct patterns, ($2^{m-64}$-k) addresses may be reserved for the handover.

FIG. 3c illustrates a structure of the IPv6 address when the MAC address field 305 of the mobile node uses the MAC address field 303. In this case, 64~m bits 302 are reserved for the handover. That is, when the address field for the handover 302 is filled with the distinct pattern, the IPv6 address becomes a unique address and reserved for the handover.

Figure 4A:
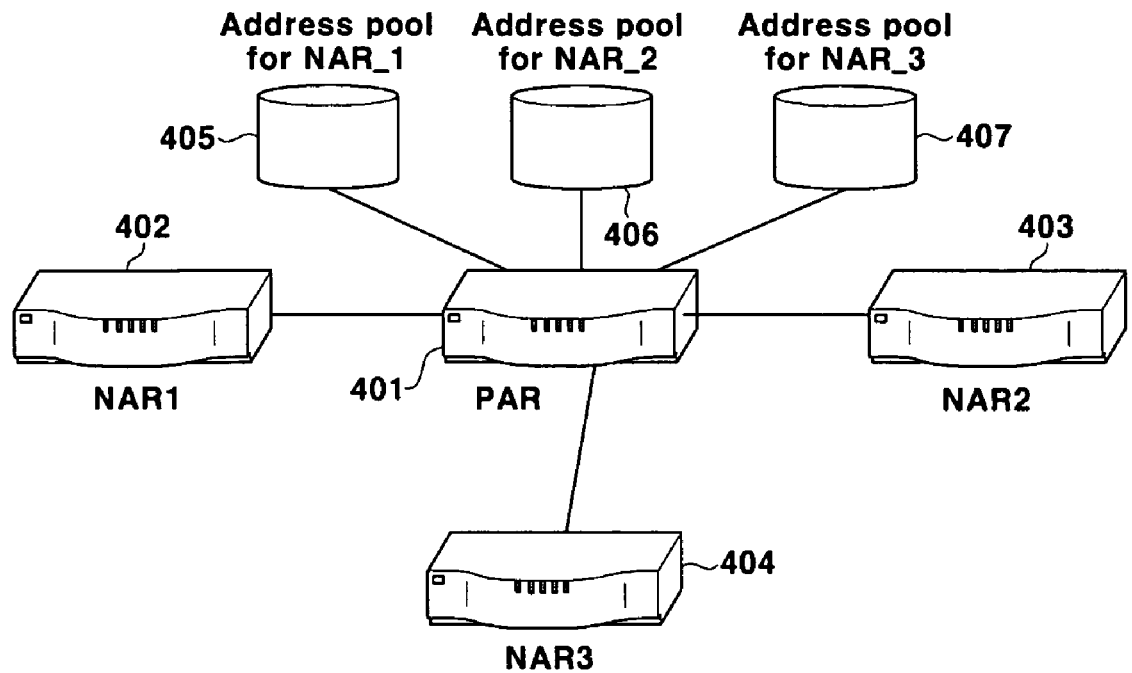
FIGS. 4a and 4b illustrate the handover according to the embodiment of the present invention.
Figure 4B:
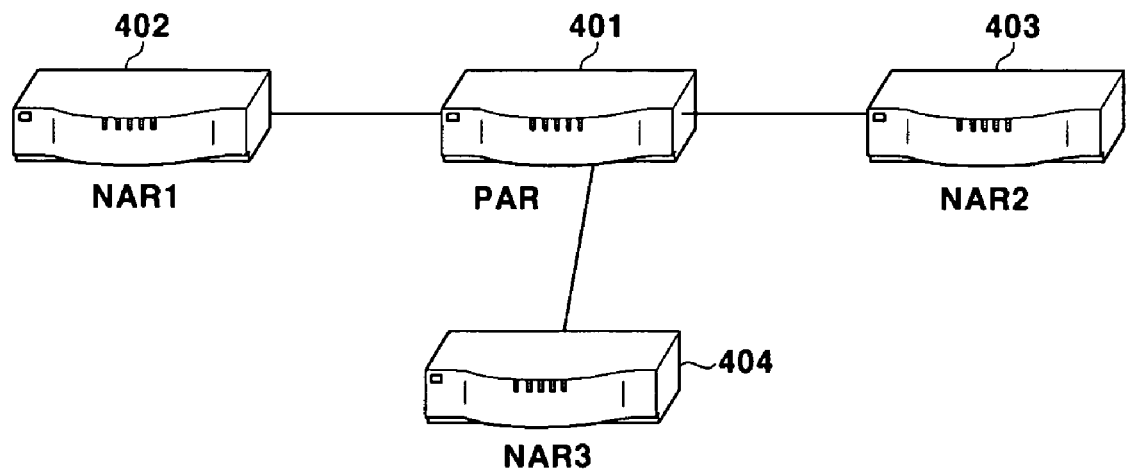

FIG. 4b and FIG. 4b illustrate a handover structure according to the embodiment of the present invention. FIG. 4 exemplarily illustrates that three NARs are connected to one PAR, and more than four NARs may be connected thereto.

FIG. 4a illustrates a handover structure when using the MAC address of the NAR as a new IPv6 address as shown in FIG. 3b.

In FIG. 4a, the reference numeral 401 represents a previous access router (PAR) in which a current mobile node is connected. Further, the reference numerals 402, 403 and 404 respectively represent new access routers (NAR1, NAR2 and NAR3) to which the mobile node will move, and the mobile node moves one of the NAR1, NAR2 and NAR3 in consequence to the occurrence of the handover. The reference numerals 405, 406 and 407 respectively represent address pools storing and managing handover addresses of NAR1 402, NAR2 403 and NAR3 404. Herein, each of the address pools stores and manages the handover address based on the MAC address of a corresponding NAR, as shown in FIG. 3b.

FIG. 4b illustrates a handover structure when using the MAC address of the mobile node as a new IPv6 address as illustrated in FIG. 3c.

As shown in FIG. 4b, no address pool for the handover address is prepared when the MAC address of the mobile node is used as the new IPv6 address, differing from the handover structure using the MAC address of the NAR. In other words, the handover addresses are specified by the address field for the handover of the IPv6 address, and each of the handover addresses is specified by the MAC address of the mobile node.

Figure 5A:
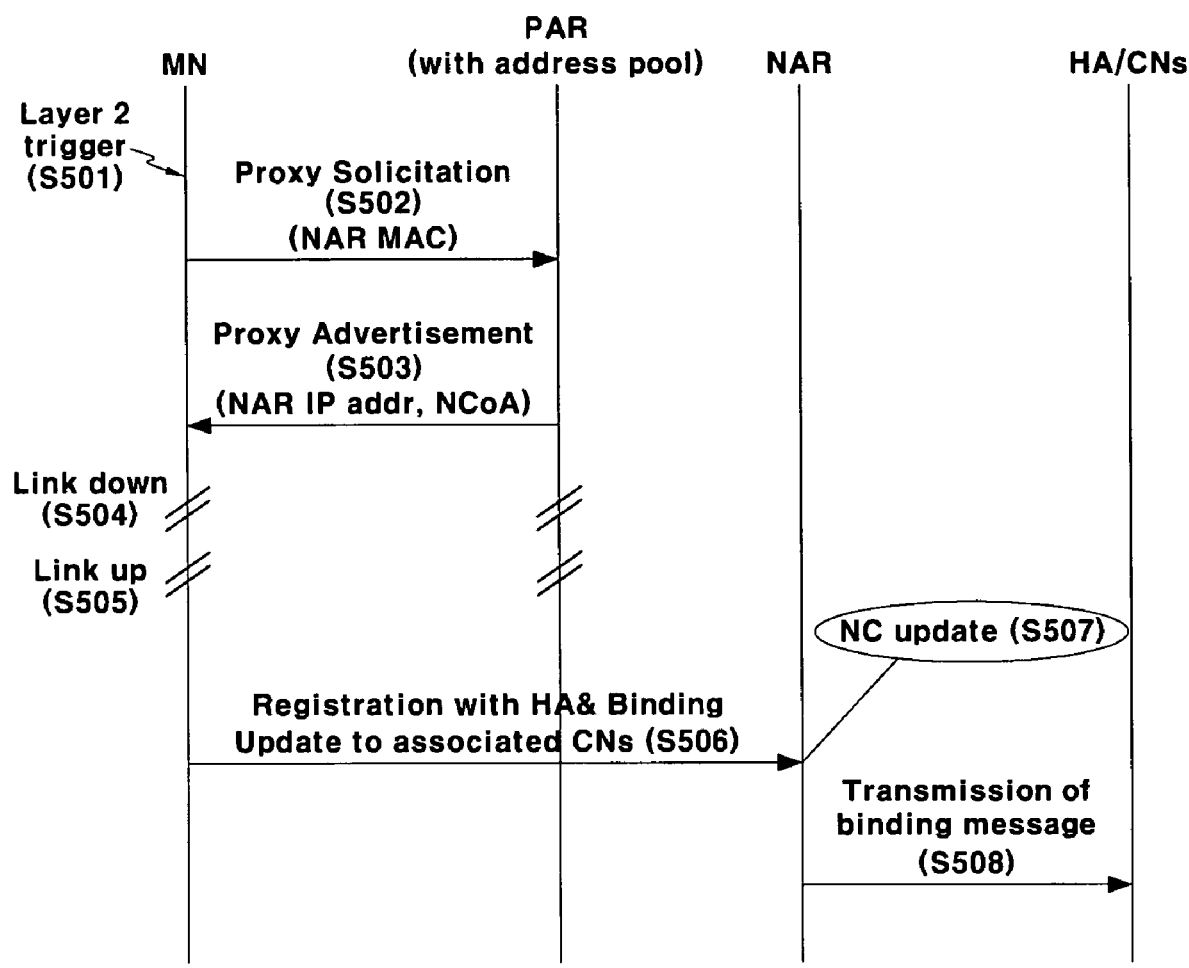
FIGS. 5a and 5b illustrate the handover according to the embodiment of the present invention in detail.
Figure 5B:
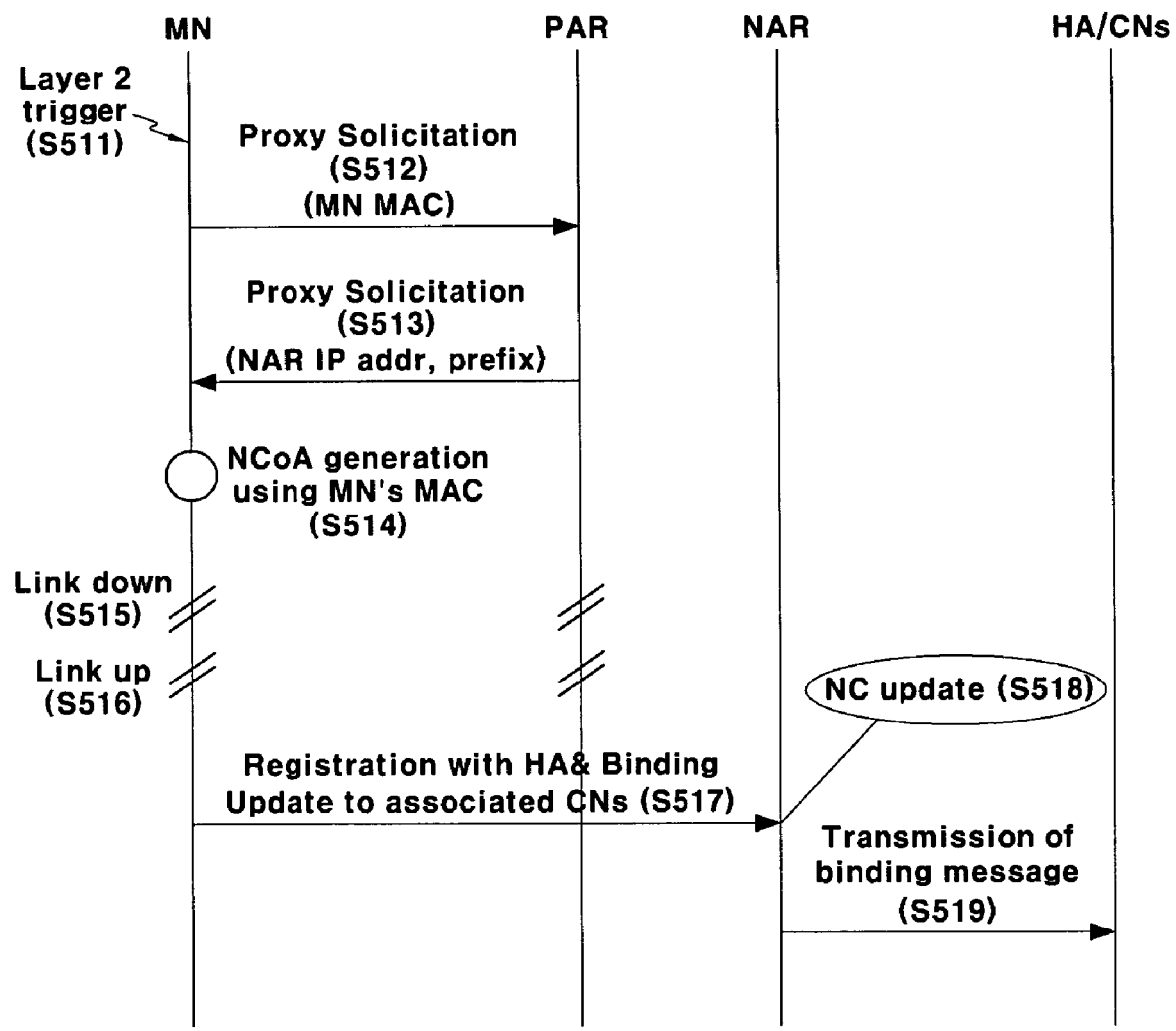

FIG. 5a and FIG. 5b illustrate a handover process according to the embodiment of the present invention in detail. FIG. 5a illustrates a handover occurrence when using the MAC address of the NAR, and the FIG. 5b illustrates the handover occurrence when using the MAC address of the mobile node.

As shown in FIG. 5a, when using the MAC address of the NAR, the mobile node receives the Layer 2 trigger message pre-notifying occurrence of the Layer 2 handover, in Step of S501. Herein, the trigger message includes an address of the Layer 2 (e.g., the MAC address of the NAR). The mobile node sends proxy solicitation message requesting information on an IP address of the NAR to the PAR using the MAC address of the NAR included in the trigger message, in Step of S502. The PAR having received the proxy solicitation message responds by sending information on a new CoA (NCoA) to be used for the NAR and the IP address of the NAR to the mobile node, in Step of S503. The NCoA represents a handover address pool for an associated NAR managed by the PAR.

When a new link is established in consequent to completion of the Layer 2 handover including link down and link up processes (steps S504 and S505), the mobile node immediately performs the registration the new link with the HA and a binding update to the associated CN and sends a message notifying the registration and the binding update to the NAR, in Step of S506. Further, the NAR updates a neighbor cache (NC) managed by the NAR in response to the message in Step of S507, and sends the updated neighbor cache to the HA and the associated CN, in Step of S508.

Meanwhile, the handover process using the MAC address of the mobile node is as follows.

As shown in FIG. 5b, the mobile node receives the Layer 2 trigger message informing that the Layer 2 handover will occur, in Step of S511. In this case, the trigger message includes the Layer 2 address (e.g., the MAC address of the mobile node). Then, the mobile node sends the proxy solicitation message to request the IP address of the NAR from the PAR using the MAC address of the mobile node included in the trigger message, in Step of S512. Then, the PAR which has received the proxy solicitation message responds by sending the prefix information and the IP address of the NAR to the mobile node, in Step of S513. Further, the mobile node creates an NCoA to be used in the NAR with reference to the information on the prefix of the NAR received from the PAR, in Step of S514.

Once the new link is established in consequence to completion of the Layer 2 handover including the link down and link up processes (S515 and S516), the mobile node immediately registers the new link with the HA and sends the binding update to the associated CN, and sends a message to the NAR to notify the registration and the binding update, in Step of S517. The NAR updates the neighbor cache in response to the message in Step of S518, and sends the updated neighbor cache to the HA and the associated CN, in Step of S519.

Therefore, the handover latency may be reduced because the DAD process is not necessary to verify the NCoA according to the embodiment of the present invention. However, it may cause loss of data packets when the handover process according to the present invention is applied to applications allowing no loss of data packets unless the packets are buffered when the handover occurs.

Figure 6:
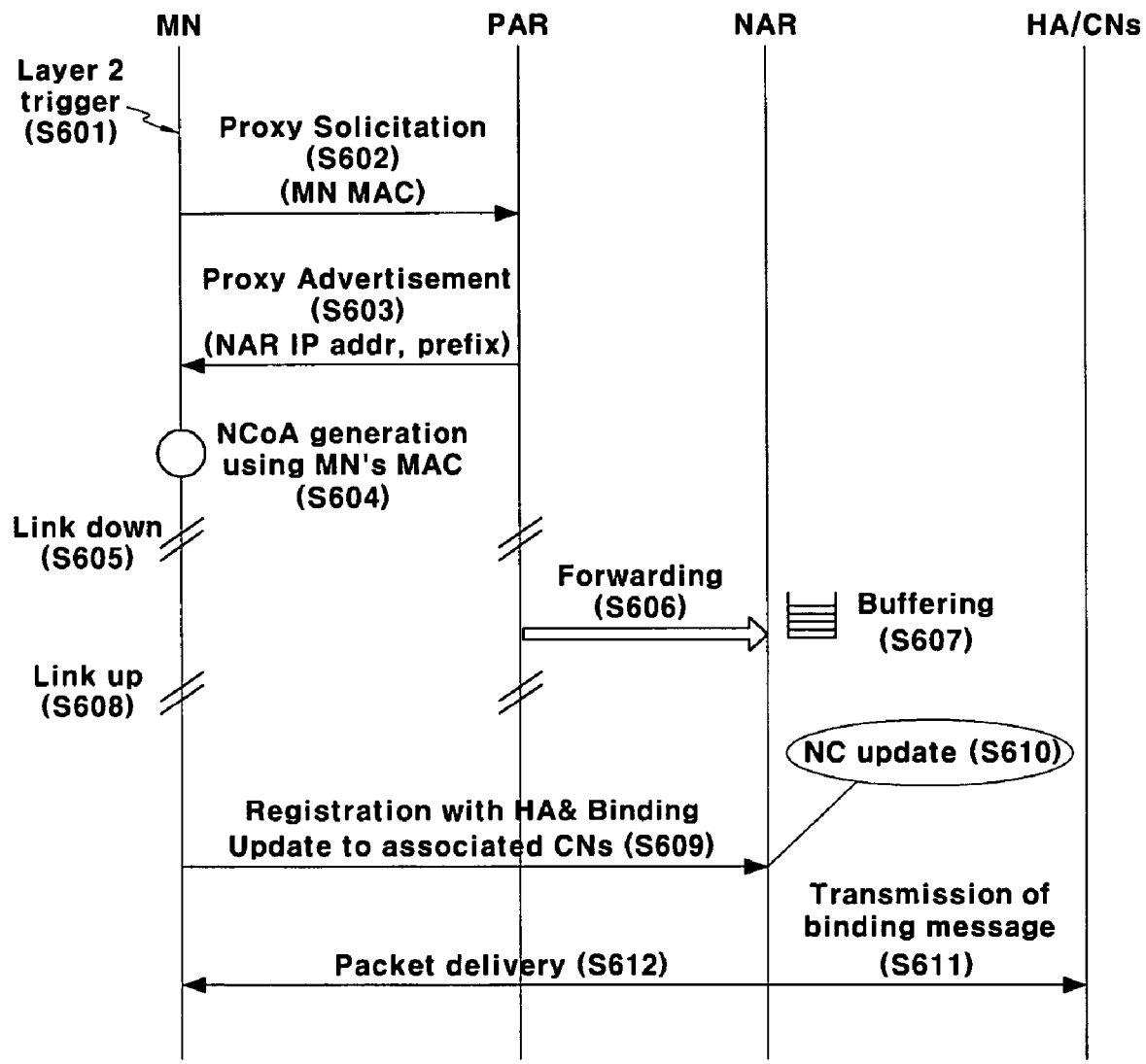
FIG. 6 illustrates the handover without loss of packets in FIG. 5b.

FIG. 6 illustrates a handover to prevent packet loss according to the embodiment of the present invention. FIG. 6 exemplarily illustrates a case of using a MAC address of the mobile node, and it is also applied to a case of using a MAC address of the NAR.

As shown in FIG. 6, the mobile node receives the Layer 2 trigger message pre-notifying the occurrence of the Layer 2, in Step of S601. Herein, the trigger message includes the Layer 2 address (e.g., the MAC address of the NAR). The mobile node sends the proxy solicitation message requesting the information on the IP Layer of the NAR from the PAR using the MAC address of the NAR included in the Layer 2 trigger message, in Step of S602. The PAR that has received the message responds by sending information on the prefix and the IP address of the NAR to the mobile node, in Step of S603. The mobile node establishes an NCoA to be used in the NAR with reference to the information on the prefix sent from the PAR, in Step of S604.

Once the link down occurs in Step of S605, the PAR forwards the packet data sent to the mobile node to the NAR, in Step of S606, and the NAR buffers the packet data until with the mobile node is connected to the NAR, in Step of S607.

When the new link is established in consequence to completion of the link up and the Layer 2 handover in Step S608, the mobile node immediately registers the new link with the HA and sends the binding update to the associated CN, and sends a message to the NAR to notify the registration and the binding update, in Step of S609. The NAR updates the neighbor cache in Step of S610, and sends the packet data buffered by the NAR to the mobile node in Step of S612 while sending the updated neighbor cache to the HA and the associated CN, in Step of S611.

Figure 7A:
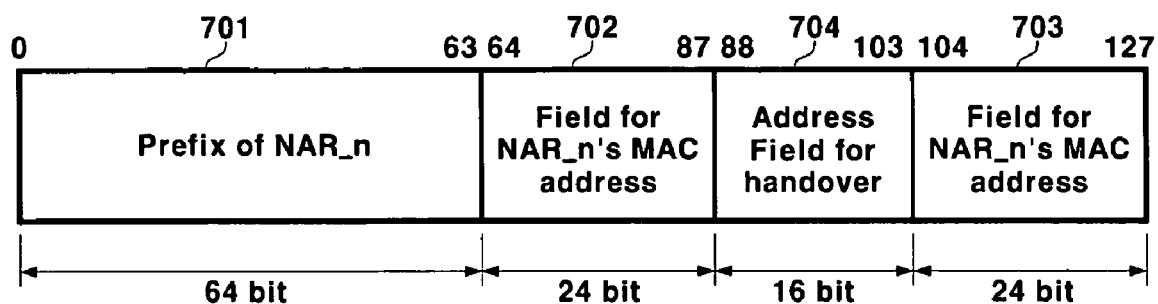
FIG. 7 illustrates an address structure applying the EUI-64 standard employing a 48-bit IEEE address system.
Figure 7B:
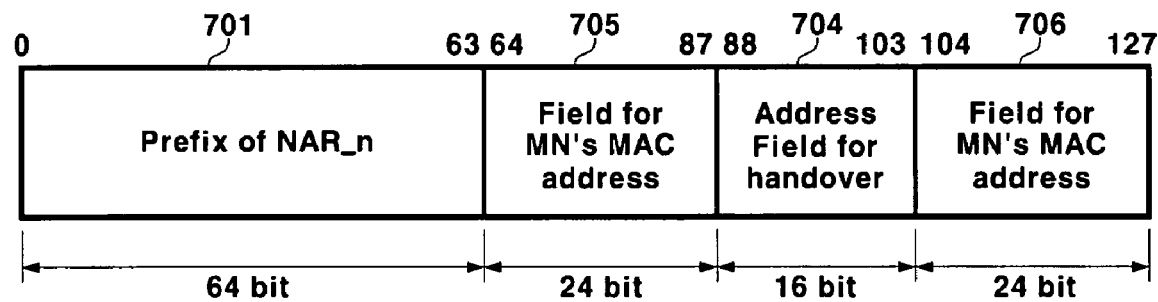

FIG. 7a and FIG. 7b illustrate a case of applying the EUI-64 standard employing the 48-bits IEEE address system to the IPv6 address according to the embodiment of the present invention. FIG. 7a illustrates the case of using the MAC address of the NAR, and FIG. 7b illustrates the case of using the MAC address of the mobile node.

In FIG. 7a, the reference numeral 701 represents a prefix attached to a NAR, and the reference numerals 702 and 703 represent 48-bit MAC addresses of the NAR according to the EUI-64 standard. The reference numeral 704 represents a 16-bit address field for the handover excluding the 48-bit MAC address of the NAR among the 64-bit subfield. In this case, 216 addresses are reserved for the handover. However, according to the EUI-64 standard, FF FF are FF FE are prefixed addresses, and therefore 65,534 addresses ($2^{16}-2$) are available for the handover. These handover addresses are respectively managed by the PAR using the address pool for the corresponding NAR.

Further, in FIG. 7b, the reference numeral 701 represents the prefix attached to the NAR, and the reference numerals 702 and 703 represent the 48-bit MAC addresses of the mobile node according to the EUI-64 standard. The reference numeral 705 represents the 16-bit address field for the handover excluding the 48-bit MAC address of the NAR among the 64-bit subfield. As described, the FF FF and FF FE are prefixed addresses according to the EUI-64 standard, and therefore, FF FD may be available for the handover.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Accordingly, the present invention provides a fast handover by reserving an address for a handover prior to an actual occurrence of the handover. Herein, the address is not required to be verified through a DAD process because the address is unique in the mobile IPv6 according to the embodiment of the present invention.

In addition, the present invention provides cost effectiveness because the address for the handover can be reserved by simply using certain bits which are not currently in use, without adding a new process or modifying messages.

Further, the handover method can be applied not only to applications employing a 48-bit IEEE address system but also applications employing a MAC address system. Moreover, the address for the handover can be reserved and thereby providing a rather more stable and fast handover method than FMIv6.

What is claimed is:

1. A handover method of the mobile IPv6 (Internet protocol version 6) comprising:
    a) a mobile node receiving a Layer 2 trigger message pre-notifying of a Layer 2 handover that has yet to occur;
    b) the mobile node requesting information on Layer 3 of a new access router (NAR) from a previous access router (PAR) by using information included in the Layer 2 trigger message;
    c) the mobile node receiving information on an IP address of the NAR and a unique, new care-of-address (NCoA) to be used when moving to the NAR from the PAR comprising an address pool storing and managing a handover address field; and
    d) the mobile node performing registration with a home agent (HA) of the mobile node and sending a binding update to an associated correspondence node (CN) by using the NCoA when a Layer 2 handover has occurred without requiring the HA to perform a duplicate address detection of the NCoA to reduce a handover latency.

2. The handover method according to claim 1, wherein b) comprises the mobile node requesting the information on the Layer 3 of the NAR from the PAR using a MAC address of the NAR included in the Layer 2 trigger message.

3. The handover method according to claim 1, wherein the NCoA comprises a prefix information field storing information on a prefix attached to the NAR, a MAC address field storing a MAC address of the NAR, and a handover address field storing a handover in a certain pattern.

4. The handover method according to claim 1, wherein the Layer 2 handover comprises link down and link up processes,
    the PAR forwards packets sent to the mobile node to the NAR and the NAR buffers the forwarded packets data when the link down is occurred, and
    the NAR sends the buffered packet data to the mobile node when the link up is occurred and the Layer 2 handover is completed.

5. A handover method of the mobile IPv6 (Internet protocol version 6) comprising:
    a) a mobile node receiving a Layer 2 trigger message pre-notifying of a Layer 2 handover that has yet to occur;
    b) the mobile node requesting information on Layer 3 of a new access router (NAR) from a previous access router (PAR) by using information included in the Layer 2 trigger message;
    c) the mobile node receiving the information on the Layer 3 of the NAR from the PAR;
    d) the mobile node creating a unique new care-of-address (NCoA) which is used when moving to the NAR by using the information on the Layer 3 of the NAR and comprises a handover address field storing a handover in a certain pattern; and
    e) the mobile node performing registration with a home agent (HA) of the mobile node and sending a binding update to an associated correspondence node (CN) by using the NCoA when a Layer 2 handover has occurred, without requiring the HA to perform a duplicate address detection of the NCoA to reduce a handover latency.

6. The handover method according to claim 5, wherein b) comprises the mobile node requesting the information on the Layer 3 of the NAR from the PAR by using a MAC address of the NAR included in the Layer 2 trigger message.

7. The handover method according to claim 5, wherein c) comprises the mobile node receiving an IP address and prefix information of the NAR from the PAR, and
    d) comprises the mobile node creating a new Care of Address (NCoA) using the prefix information of the NAR.

8. The handover method according to claim 7, wherein the NCoA comprises a prefix information field storing information on a prefix attached to the NAR, a MAC address field storing a MAC address of the NAR.

9. The handover method according to claim 5, wherein the Layer 2 handover comprises link down and link up processes, the PAR forwards packets sent to the mobile node to the NAR and the NAR buffers the forwarded packets data when the link down is occurred, and the NAR sends the buffered packet data to the mobile node when the link up is occurred and the Layer 2 handover is completed.

* * * * *